US010584584B2

(12) United States Patent
Verhardt (10) Patent No.: US 10,584,584 B2
(45) Date of Patent: Mar. 10, 2020

(54) APPARATUS, METHOD, AND PLATFORM FOR REAL-TIME MOBILE BROADBAND COMMUNICATION DATA

(75) Inventor: Jean Verhardt, Noordwijk (NL)

(73) Assignee: ESTRELLASAT BV (NL)

( * ) Notice: Subject to any disclaimer, the term of this patent is extended or adjusted under 35 U.S.C. 154(b) by 107 days.

(21) Appl. No.: 12/708,837

(22) Filed: Feb. 19, 2010

(65) Prior Publication Data

US 2010/0256862 A1   Oct. 7, 2010

Related U.S. Application Data

(60) Provisional application No. 61/208,278, filed on Feb. 20, 2010.

(51) Int. Cl.
*G01M 17/00* (2006.01)
*E21C 47/00* (2006.01)

(52) U.S. Cl.
CPC .................................. *E21C 47/00* (2013.01)

(58) Field of Classification Search
USPC ... 701/29.2, 29.3, 29.7, 32.1, 34.3, 50, 31.4, 701/31.5
See application file for complete search history.

(56) References Cited

U.S. PATENT DOCUMENTS

| | | | |
|---|---|---|---|
| 6,137,885 A | 10/2000 | Totaro et al. | |
| 6,292,724 B1 | 9/2001 | Apsell et al. | |
| 6,515,617 B1 | 2/2003 | Demers et al. | |
| 6,584,083 B1 | 6/2003 | Toporek et al. | |
| 6,651,001 B2 | 11/2003 | Apsell | |
| 6,711,495 B1 | 3/2004 | Ukai et al. | |
| 6,751,452 B1 | 6/2004 | Kupczyk et al. | |
| 6,820,132 B1 | 11/2004 | Puente et al. | |
| 6,836,658 B1 | 12/2004 | Sharon et al. | |
| 6,975,266 B2 | 12/2005 | Abraham et al. | |
| 6,985,542 B1 | 1/2006 | Nir et al. | |
| 7,136,620 B2 | 11/2006 | Wang | |
| 7,155,321 B2 | 12/2006 | Bromley et al. | |
| 7,215,648 B2 | 5/2007 | Sullivan | |
| 2002/0016655 A1 | 2/2002 | Joao | |
| 2002/0156558 A1 | 10/2002 | Hanson et al. | |
| 2002/0173885 A1 | 11/2002 | Lowrey et al. | |
| 2003/0093199 A1 | 5/2003 | Mavreas | |

(Continued)

*Primary Examiner* — Kim T Nguyen
(74) *Attorney, Agent, or Firm* — Hulsey P.C.

(57) ABSTRACT

The present disclosure teaches Real-time mobile broadband data access via satellite to mobile heavy equipment and personnel, focusing on health and safety solutions to open-pit mining operations in remote areas of the world. The system consists of a platform which allows for the integration of health and safety solutions, status monitoring systems, and transmitting broadband information in Real-time from these systems to anywhere in the world. The present disclosure's teachings include: 1) Gathering information from the sensors on work vehicles and personnel; 2) Transmitting Real-time broadband data packets over a wireless appliance; 3) Translating and processing information obtained through an intelligent diagnostic application which is placed on board heavy mobile vehicles and personnel and then transmitting it via a wireless network; and 4) Displaying the information collected in Real-time anywhere in the world via host computers or on a web page.

20 Claims, 8 Drawing Sheets

(56) References Cited

U.S. PATENT DOCUMENTS

2004/0145241 A1  7/2004 Arakawa et al.
2006/0212203 A1  9/2006 Furuno
2007/0142928 A1* 6/2007 Moughler et al. .............. 700/12
2008/0015748 A1  1/2008 Nagy
2009/0140872 A1* 6/2009 O'Neal et al. ................ 340/679

* cited by examiner

FIG. 4
*(SCREENSHOT)*

51. HelicopterView GUI

*FIG. 5*
*(SCREENSHOT)*

52. UnitView / PersonnelView GUI

*FIG. 6*
*(SCREENSHOT)*

54. Bio-metric view GUI

*FIG. 7*
*(SCREENSHOT)*

FIG. 8

APPARATUS, METHOD, AND PLATFORM FOR REAL-TIME MOBILE BROADBAND COMMUNICATION DATA

RELATED APPLICATIONS

This application claims the benefit of provisional patent application 61/208,278, entitled "METHOD AND SYSTEM FOR REMOTE SATELLITE COMMUNICATIONS AND SYSTEM MONITORING", and filed on Feb. 20, 2009, which is hereby incorporated by reference.

FIELD

The present disclosure relates in general to the transmission of broadband data in Real-time to and from heavy mobile work vehicles and personnel. More particularly, the present disclosure relates to a platform that integrates several health and safety solutions, and even more particularly to, information gathered from sensors on board a work vehicle. Further, the present disclosure relates to the translation and transmission of Real-time through a next generation wireless network, and more particularly to the information inputted from an interactive system for subsequent communication with a remote data center, or control center.

DESCRIPTION OF THE RELATED ART

Substantial literature exists describing heavy mobile vehicle data recording and transmitting systems.

A major limitation of current heavy mobile vehicle data recording and transmitting systems is an inability to allow for broadband Real-time transmission of data from a given remote open-pit mining area to control centers located anywhere in the world.

A further limitation of current heavy mobile vehicle data recording and transmitting systems is Real-time monitoring of the health and safety of working personnel in remote open-pit mines. As a result, this important information cannot be analyzed on a Real-time basis, leading to late responses to problems and consequently efficiency and productivity decrease and, most importantly, health and safety may be compromised.

Yet, a further limitation of current heavy mobile vehicle data recording and transmitting systems is failure to provide a reliable quick response to Biometric changes in working personnel so that supervisors can take steps to prevent accidents and/or injuries. Without the broadband data transmission in Real-time, information concerning maintenance, health, security or the replacement of parts may not be provided in time for effective intervention.

Consequently, there is a need for the operators of heavy mobile machinery to be able to request and receive Real-time assistance.

A further need exists for a simplified Voice over Internet Protocol (VoIP) that allows an operator to contact a technical support group or the control center management board through video or audio from anywhere in the world in Real-time.

Yet, a further need exists for the technical support or management board to be able to support not only the conditions of a heavy mobile vehicle but also the health and safety of personnel at remote mine locations.

Moreover, a need exists for a mobile data platform that gathers and sends broadband information in Real-time. Such a platform may be key to a variety of applications such as, but not limited to, data recording and transmitting systems for remotely managed vehicle fleets, tracking vehicle operator work hours, or continuously assessing the condition of a working vehicle for maintenance purposes.

Finally, a need exists to improve productivity by increasing the delivery performance of information.

SUMMARY

The following description is not to be taken in a limiting sense, but is made for the purpose of describing the general principles of the present disclosure. The scope of the present disclosure should be determined with reference to the claims.

The present disclosure teaches a real-time mobile communication platform for continuously collecting, analyzing, and transmitting broadband information associated with the operation of a heavy equipment vehicle in association with an affiliated operator. More concretely, a real-time mobile communication platform comprising a remote unmanned apparatus, an earth station associated with a data receiver, status monitoring sensors, a plurality of biometric sensors, a microprocessor, a warning device, a plurality of broadband wireless communication devices, a plurality of broadband wireless communication devices, and a control room. The present disclosure teaches broadband Real-time data transmission systems to and from heavy mobile vehicles and personnel in remote areas of the world. More particularly, a method and apparatus for continuously collecting, analyzing and transmitting in Real-time broadband information concerning the actual conditions and operations of a work vehicle and personnel in detail and with a high degree of reliability. A gathering apparatus is designed to collect multiple prompts according to a predetermined algorithm.

The present disclosure provides information on the status of a work vehicle that may consists of: the position of the heavy mobile vehicle, the condition of its parts, vehicle security, and personnel health and safety. The present disclosure also may allow for remote control of a vehicle. The information on the position of the vehicle or work personnel may be acquired and gathered from Geo-fencing technology, where the high precision GPS establishes a safety zone around working vehicles and personnel. The information on the position of the vehicle or work personnel may also alerts operators through warnings and alarms in the event of problems or hazards.

In addition, the present disclosure teaches a diagnostic tool integrated in a microprocessor system for heavy mobile vehicles and personnel. The integration consists of several health and safety devices as well as status-monitoring sensors located on both the heavy mobile vehicle and in BioVests worn by personnel. The information gathered from the sensors on board the vehicle is transmitted to an On-Board Computer (OBC), which is then translated through a predetermined algorithm. The information gathered from the sensors in the personnel BioVests is transmitted to a microprocessor either within the BioVest or to a handset device and translated through the predetermined algorithm.

An exemplary integrated system that may consist of a wireless network. The information gathered from the many sensors may be transmitted in Real-time broadband through the next generation of Wireless Fidelity (Wi-Fi) or Worldwide Interoperability for Microwave Access (WiMAX) to a central control room at the mine. The information may be sent in Real-time anywhere in the world and made accessible on a display. The system may integrate multi-connectivity network systems depending on the area where the mobile heavy equipment is based: 1) WiMAX or next generation Wi-Fi mesh for open-pit mine inside perimeter; 2) Mobile phone connectivity, 3G-2G, GSM, GPRS, when the mobile heavy vehicles move to areas where this kind of connectivity is available; 3) Private mobile satellite connectivity for outside mine perimeter, and where mobile cell phone connectivity is limited or non-existent.

According to one aspect of the present disclosed subject matter, sensors from a heavy mobile vehicle can extract vital information from the Controlled Area Network (CANbus) data. This information may then be processed through a translation diagnostic system and may be transmitted via an OBC to the wireless mesh on the mine. Each vehicle operator or other personnel connected to the system has a unique ID from which the system recognizes each one's identity and status.

In general terms, the data transmitted results from the broadband integration in Real-time of the following apparatuses: 1) CANbus/Work vehicle sensors information; 2) Fatigue management analysis apparatus; 3) Tire monitoring system; 4) Remote/unmanned controlled vehicle system; 5) Precision location of the work vehicle; 6) Geo-fence system; 7) Video-Conference on VoIP; and 8) BioVest monitoring systems for the personnel. Inputs received from those sensors may be configured and transmitted over a wireless data link to a data receiver. The platform system may integrate a variety of solutions according to a predetermined algorithm configured to transmit Real-time data over a broadband network worldwide.

Other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages be included within this description, be within the scope of the accompanying claims.

BRIEF DESCRIPTIONS OF THE DRAWINGS

The present subject matter will now be described in detail with reference to the drawings, which are provided as illustrative examples of the subject matter so as to better enable those skilled in the art to practice the subject matter. The present subject matter will be more fully understood from the following detailed descriptions reviewed in conjunction with the accompanying drawings, where like reference numerals refer to like elements. Notably, the figures and examples are not meant to limit the scope of the present subject matter to a single embodiment, but other embodiments are possible by way of interchange of some or all of the described or illustrated elements and, further, wherein.

DETAILED DESCRIPTION OF THE INVENTION

In the present specification, an embodiment showing a singular component should not be considered limiting. Rather, the subject matter encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such.

Further, the present subject matter encompasses present and future known equivalents to the known components referred to herein by way of illustration. In describing embodiments of the present disclosure illustrated in the drawings, specific terminology is employed for the sake of clarity.

Figure 1:
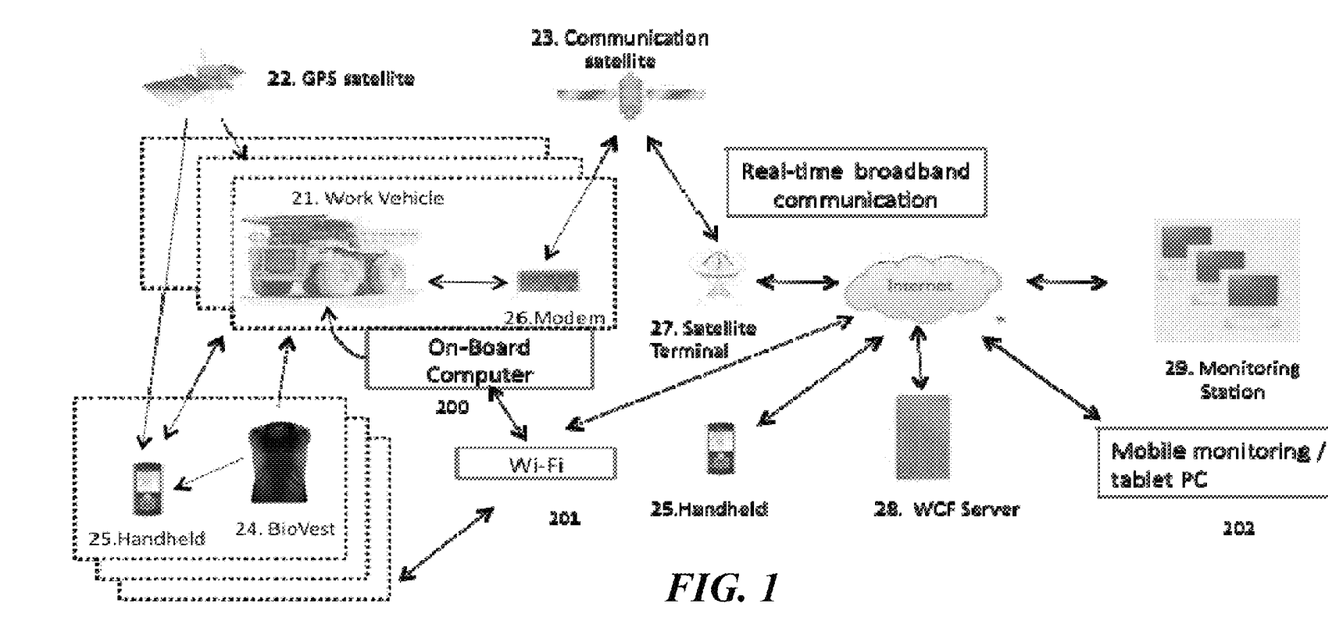
FIG. 1 is an illustration of the general concept of EMDP, showing multiple mobile heavy vehicles and BioVests connected through a wireless link to a central monitoring management station.

FIG. 1 shows a system conceptual diagram describing the general system. Information generated by the sensors in a work vehicle 21 is split into two pieces of information. One of the pieces is data indicating the position of the vehicle, which is transmitted in Real-time to a central information management center, herein called monitoring station 29, from the OBC 200 by means of an antenna and an artificial satellite, herein called GPA satellite 22. The information on the position of work vehicle 21 may include, but is not limited to, longitude, latitude bearing, speed, Dilution of Precision (DOP), and other GPS parameters (SatTime, SatDate, StrongSats, FixQuality) and altitude received from a GPS satellite 22. The second piece contains information on driver (or personnel) health status, herein called BioVest 24, and sensors from the work vehicle 21, and is transmitted to the monitoring station 29, or to any mobile monitoring system such as a tablet PC 202. This information data flow can be also analyzed and displayed in Real-time over a handset 25 by way of a multi-connectivity modem through a satellite-linked network.

A signal is transmitted by the vehicle and is reflected by GPS satellite 23 to any satellite terminal 27 adjusted to the frequency of the system. The information passes through broadband Internet connectivity and is available to end customers on monitoring stations 29.

Figure 2:
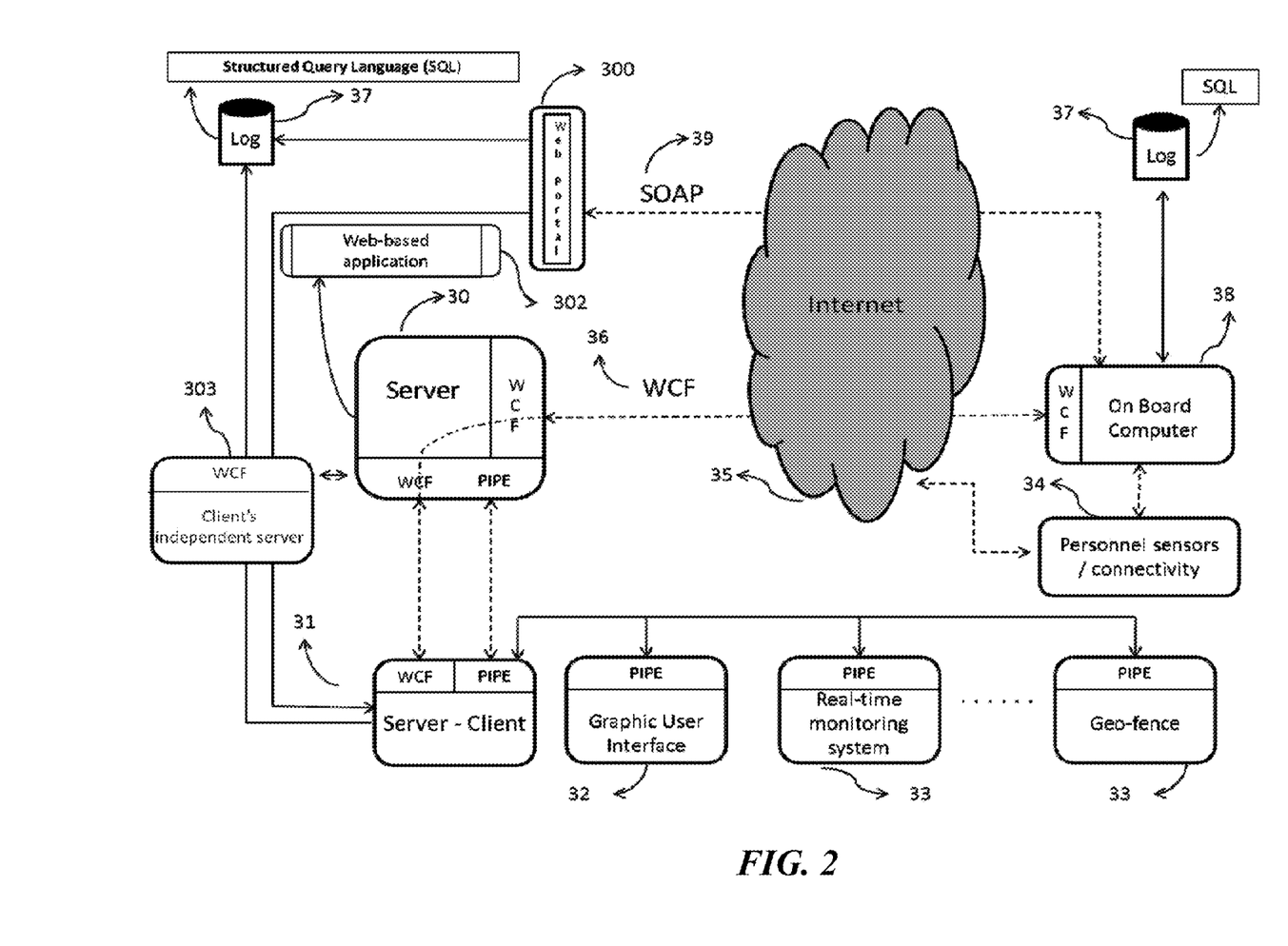
FIG. 2 is a diagram of the architecture and network of the platform where Real-time communication runtime is performed using Windows Communication Foundation (WCF) protocol and large log files are transmitted by means of Simple Object Access Protocol (SOAP) communication protocol.

Referring now to FIG. 2, the system information gathered in the OBCs 38 and Personnel sensors 34 is sent through a broadband Internet connection 35 via Windows Communication Foundation WCF protocol 36. The runtime is Real-time data 36 that it is stored in a server 30. The central server 30 sends information by pipe to secondary client servers 31 and 303 where the private information is displayed and managed. Subsequent third parties (for example, Graphic User Interfaces (GUIs) 32, and other monitoring systems such as Geo-fence 33) can be integrated into their own servers 31 from the pipe connections. Referring now to the log files 37, periodically large amounts of data can be sent, depending on the customer needs. This information is sent via SOAP communication 39 to the web portal 300 and can be stored as log files anywhere in the world. Finally, a web-based application 302 can also display the status and multiple prompt parameters of the sensors and this information is available on the Internet 35 for easy access.

Figure 3:
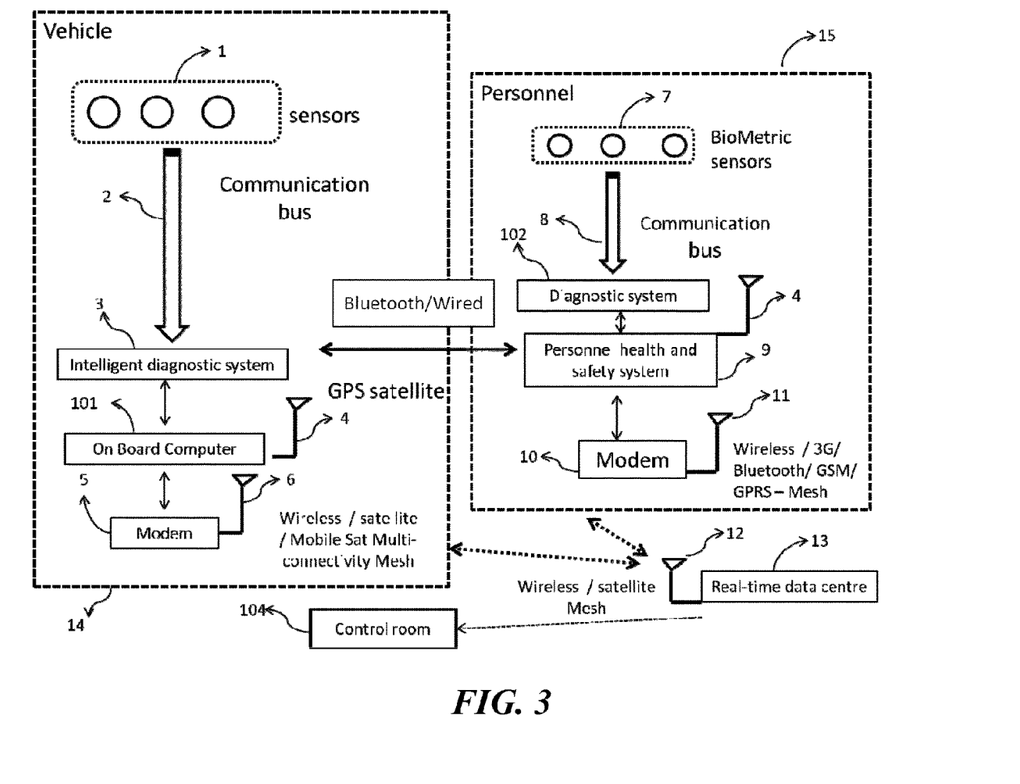
FIG. 3 is a block diagram of the architecture of the platform in the vehicle and personnel; it shows how the information is gathered from sensors in the vehicle and from the Biometric vest (BioVest) of the work personnel, then communicated to the OBCs, and transmitted via next generation wireless network to a data processing center.

The heavy mobile vehicle sensors 1 on FIG. 3 transmit information through a communication bus 2 that interprets and translates data received thanks to an intelligent diagnostic system 3. The diagnostic system transmits the data through a pre-established application algorithm to the OBC 101 mounted on the vehicle; the OBC 101 is connected to a GPS receiver antenna and to at least one network connectivity 6. The network connectivity is adjusted according the coverage areas on the modem 6 and connected to the wireless mesh at the open-pit mine. The first block of the integrated system on board the vehicle 14 has a unique ID recognition and the sensors and system block on personnel are indicated by 15. Personnel have a unique vest (BioVest) that shows the particular status of the working personnel. The inputs of the system are gathered from Biometric sensors 7 on the electronic box in the BioVest. The information collected is transmitted via a communication bus 8 to a diagnostic system 102 and then transmitted to the personnel health and safety system 9 whose location is determined by the GPS satellite 4. The information flow is transmitted to the multiple connectivity modem 10 and transmitted in Real-time to the wireless mesh depending on the network coverage 11. All the runtime information is sent in Real-time to the Data Center 13 which receives information from broadband Internet connection mesh 12. The information from remote areas can be managed from a control room 104 anywhere in the world.

Figure 4:
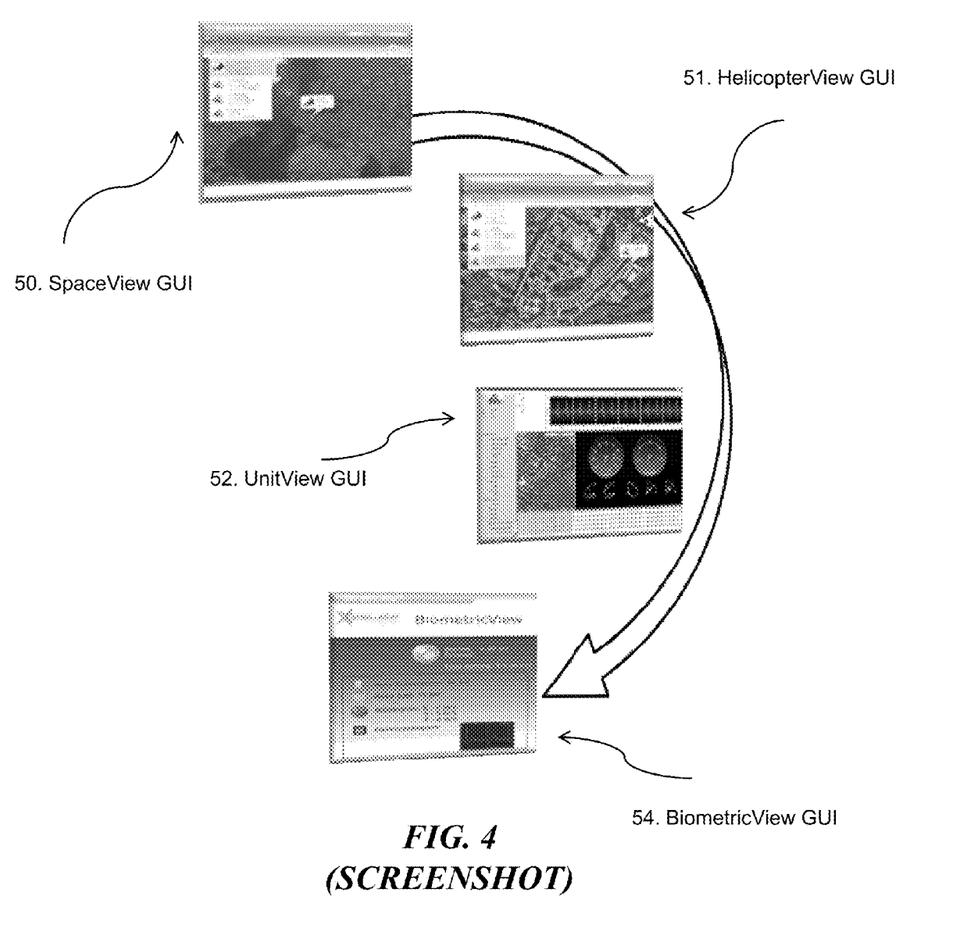
FIG. 4 shows a web-based application and display screen with the location and status of the mobile heavy vehicle and personnel.
Figure 5:
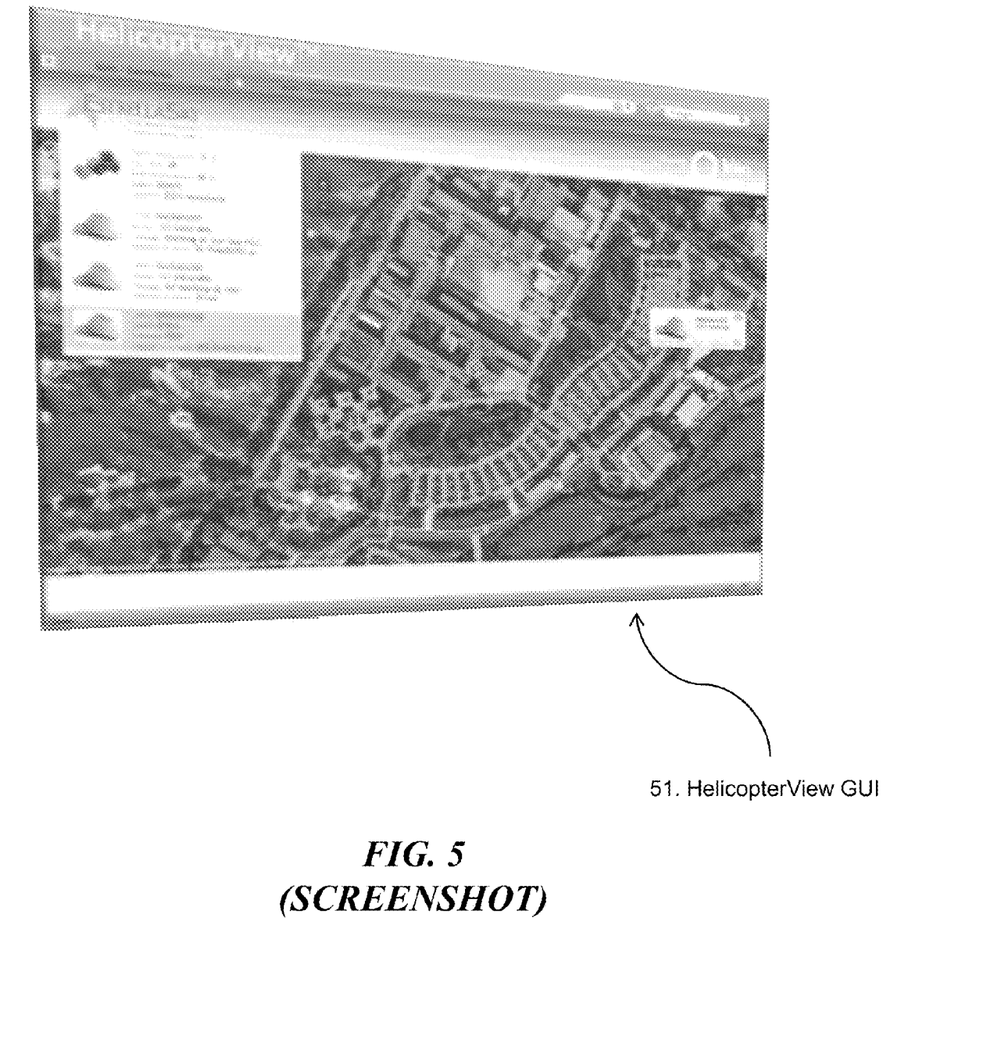
FIG. 5 provides an enlargement of the worldwide location of vehicles and personnel with the basic status information.

Management access from remote locations anywhere in the world is possible as shown on FIG. 4. The control center is able to monitor the location and status of units and personnel in Real-time 50 by means of a GUI. FIG. 5 shows a HelicopterView of the vehicle and personnel. If the control center clicks on a particular vehicle, it is able to zoom in and view the vehicle status in terms of location and motion or personnel in a particular open pit mine site. It is also able to provide basic information on the status of the units and work personnel, and in case an irregular situation occurs, a warning or an alarm alerts the control room in Real-time.

Figure 6:
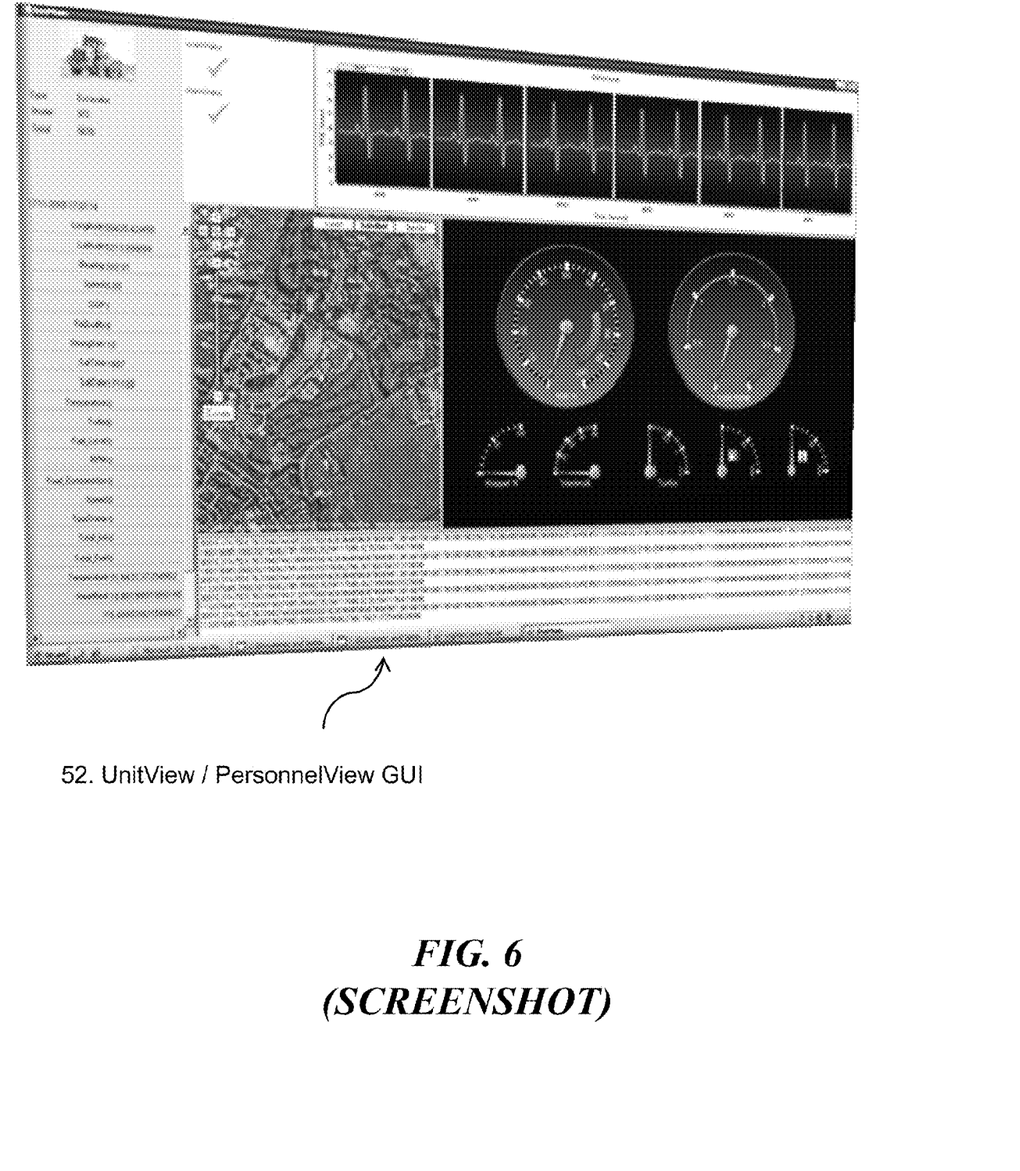
FIG. 6 provides an enlargement of the helicopter view of a mine whereby clicking on the worldwide vehicle redirects the viewer to a close-up of the unit and personnel.

FIG. 6 shows the UnitView (or PersonnelView) GUI of the system, which allows for a customized look at the heavy mobile equipment. Parameters such as location CANbus information and Biometric information can be displayed depending on the inputs of the operator center. Geo-fencing and fatigue detection analysis alarms can also be displayed, depending on the needs of the central control management room.

Figure 7:
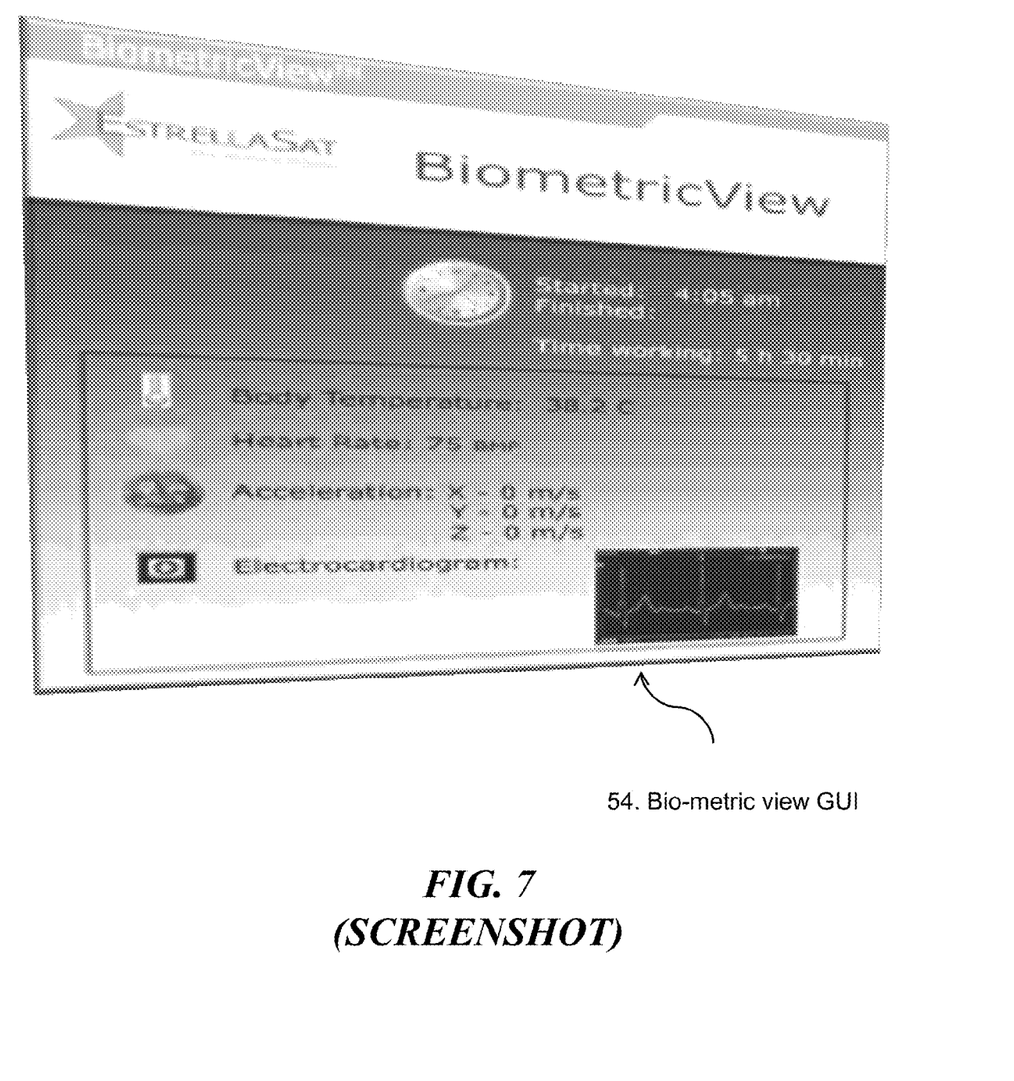
FIG. 7 provides an enlargement of the display screen, with all the detail parameters of the platform, including all the information from the vehicle sensors and personnel BioVest.

Referring now to FIG. 7, the BiometricView of the system displays such parameters as temperature, heartbeat, X-Y-Z position, and ECG indicate stress levels and abnormal behavior for personnel being monitored. This together with the location system monitoring information is transmitted Real-time to the control center room. Large log files are transmitted periodically to keep track of the entire information dataset in case there is a need to review an incident.

Figure 8:
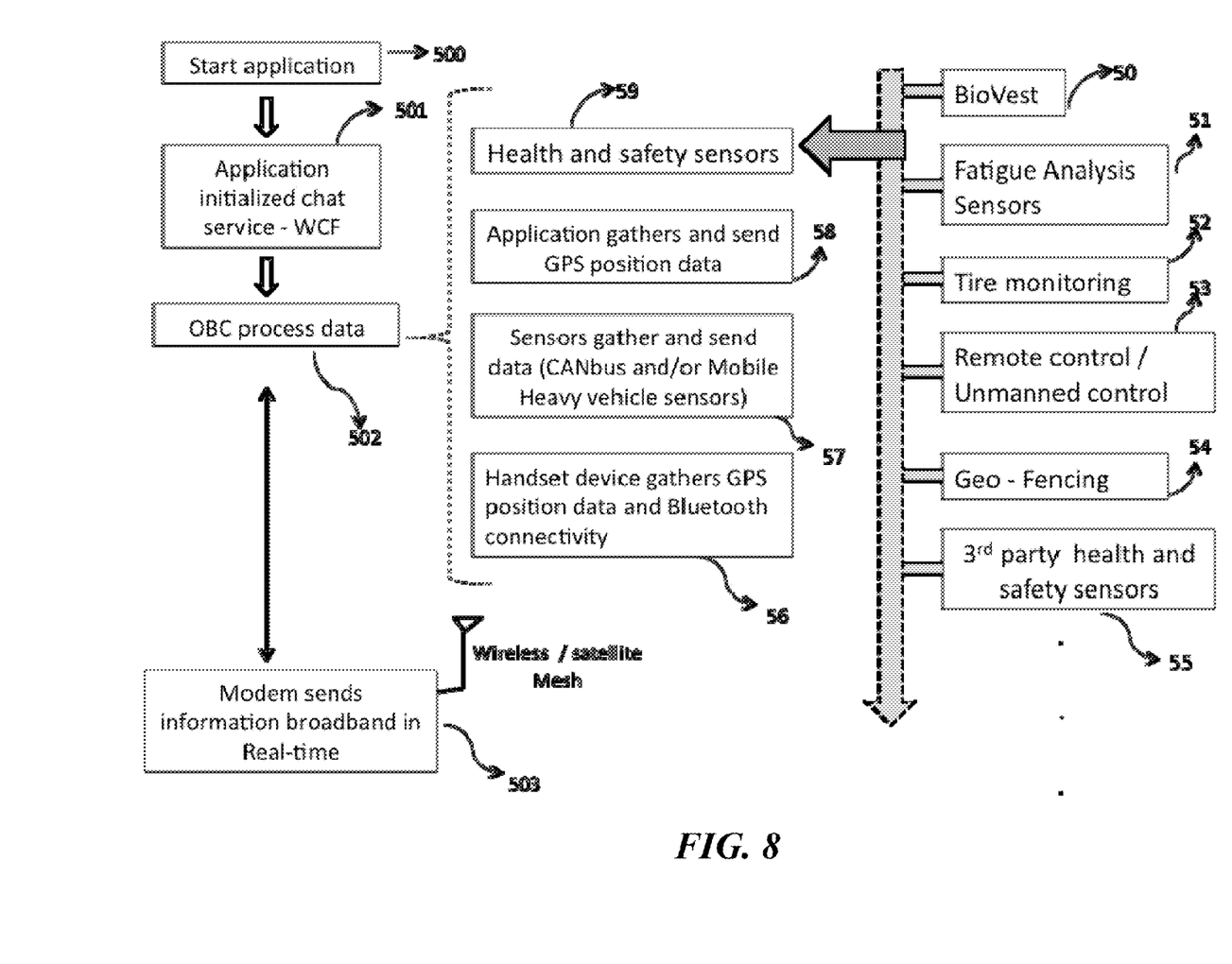
FIG. 8 represents the enlargement display of the Biometric components that the BioVest vest is able to gather.

It should be noted that the health and safety sensors 59 from FIG. 8 involve an integration of components such as 1) BioVest 50; 2) Fatigue management analysis 51; 3) Tire Monitoring 52; 4) Remote control/unmanned control 53; 5) Geo-Fencing 54; or any other third party sensors 55 able to integrate with EMDP. The set of sensors 57 and position data 58 together with the connectivity and apparatus of the personnel 56 are integrated in the onboard computer data processor 502, so that when the application starts running 500 it initializes the runtime WCF algorithm 501 to transmit Real-time data to through the modem 503 on the wireless mesh 503 to the broadband Internet connection.

The drawings and specific examples given below serve the purpose of illustration only. The specific configuration of the diagnostic system and communication arrangement may change depending on the work vehicle or platform or personnel communication being used. It can be also be modified depending on the needs of the customers which in this example, are open-pit mine control centers. The apparatus of the present disclosure is not limited to the precise detail and conditions disclosed. For example, the diagnostic system may contain various combinations of sensor information and information received from a given operator. Also, the algorithm used to generate responses from the operator is not limited to a decision tree algorithm, and other applicable responses may be sent. Furthermore, other substitutions, modifications, changes, and omissions may be made in the design, operating conditions, and arrangement of the preferred configuration without departing from the spirit of the present disclosure, as expressed in the claims appended below.

The detailed description set forth above in connection with the appended drawings is intended as a description of exemplary embodiments in which the presently disclosed process can be practiced. The detailed description includes specific details for providing a thorough understanding of the presently disclosed method and apparatus. However, it will be apparent to those skilled in the art that the presently disclosed process may be practiced without these specific details. In some instances, well-known structures and devices are shown in block diagram form in order to avoid obscuring the concepts of the presently disclosed methods and apparatus.

All references, including publications, patent applications, and patents, cited herein are hereby incorporated by reference to the same extent as if each reference were individually and specifically indicated to be incorporated by reference and were set forth in its entirety herein.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments.

The detailed description includes specific details for providing a thorough understanding of the presently disclosed method and apparatus. However, it will be apparent to those skilled in the art that the presently disclosed process may be practiced without these specific details. In some instances, well-known structures and devices are shown in block diagram form in order to avoid obscuring the concepts of the presently disclosed method and system.

The foregoing description of the disclosed embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein. It is contemplated that additional embodiments are within the spirit and true scope of this disclosed method and system as claimed below.

What is claimed is:

1. A real-time mobile communication platform for continuously collecting, analyzing, and transmitting broadband information associated with an operation of a heavy equipment vehicle in association with an affiliated operator, comprising:
   a remote apparatus for monitoring a location, condition, and security of said heavy equipment vehicle;
   an earth station associated with a data receiver for receiving private satellite channel communications information from a plurality of global satellites;
   status monitoring sensors for gathering response data, said response data including data for diagnosing a health and safety of said heavy equipment vehicle;
   a plurality of biometric sensors for diagnosing biometric data from said affiliated operator;
   a microprocessor configured to receive, translate, and process said response data;
   a warning device for alerting operators through warnings or alarms in an event of problems or hazards;
   a plurality of broadband wireless communication devices for transmitting real-time broadband data packets over a wireless communications medium;
   a graphical user interface for displaying said processed response data through a wireless mesh; and
   a control room for facilitating communication via a communication medium to a support center, a central base, or multiple sites worldwide.

2. The platform of claim 1, wherein said warning device is associated with a chat service between users and clients.

3. The platform of claim 1, wherein said warning device transmits runtime information via Wireless Communications Facility anywhere in the world.

4. The platform of claim 1, wherein the analyzing comprises conducting statistical analysis to be stored on a database.

5. The platform of claim 1, wherein said heavy equipment vehicle is associated with a remote location.

6. The platform of claim 1, wherein said heavy equipment vehicle is associated with vehicle identification information.

7. The platform of claim 1, wherein said communication medium is Voice over Internet Protocol.

8. The platform of claim 1, wherein said heavy equipment vehicle is an off-road vehicle.

9. The platform of claim 1, wherein said affiliated operator is a vehicle operator.

10. The platform of claim 1, wherein said communication device is a modem and a transmitter.

11. The platform of claim 1, wherein said graphical user interface is associated with a web-based application.

12. The platform of claim 1, wherein said graphical user interface is associated with a helicopter view or a satellite view.

13. The platform of claim 1, wherein said graphical user interface provides warning alarms.

14. The platform of claim 1, wherein said status monitoring sensors are associated with a handset device.

15. The platform of claim 1, wherein said biometric sensors are associated with a handset device.

16. The platform of claim 1, wherein said wireless mesh is coupled to a diagnostic system.

17. The platform of claim 1, wherein said microprocessor is configured to receive sensor information from a diagnostic system.

18. The platform of claim 1, wherein said warning device being an application or an algorithm.

19. The platform of claim 1, wherein said processing of said response data is associated with review of anomalies.

20. A real-time mobile communication method for monitoring the location, condition, and security of a heavy equipment vehicle in association with an affiliated operator comprising the steps of:
   continuously collecting, analyzing, and transmitting broadband information with the use of a remote unmanned platform;
   receiving private satellite channel communications information from a plurality of global satellites in association with an earth station and a data receiver;
   gathering response data and for diagnosing a health and safety of said heavy equipment vehicle in association with status monitoring sensors;
   diagnosing biometric data from said affiliated operator in association with a plurality of biometric sensors;
   receiving, translating, and processing said response data in association with microprocessor;
   alerting operators through warnings or alarms in the event of problems or hazards in association with an application algorithm;
   transmitting real-time broadband data packets over a wireless communication medium in association with a plurality of broadband wireless communication devices;
   displaying said processed response data through a wireless mesh in association with a graphical user interface; and
   facilitating communication via a communications medium to a support center, a central base, or multiple sites worldwide in association with a control room.

* * * * *